(12) United States Patent
Robichaud

(10) Patent No.: US 10,437,841 B2
(45) Date of Patent: Oct. 8, 2019

(54) DIGITAL ASSISTANT EXTENSION AUTOMATIC RANKING AND SELECTION

(71) Applicant: Microsoft Technology Licensing, LLC, Redmond, WA (US)

(72) Inventor: Jean-Philippe Robichaud, Mercier (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/289,765

(22) Filed: Oct. 10, 2016

(65) Prior Publication Data
US 2018/0101533 A1    Apr. 12, 2018

(51) Int. Cl.
*G06F 16/2457* (2019.01)
*G06N 20/00* (2019.01)
(Continued)

(52) U.S. Cl.
CPC .... *G06F 16/24578* (2019.01); *G06F 16/9535* (2019.01); *G06N 20/00* (2019.01); *G06Q 10/10* (2013.01); *H04L 12/2816* (2013.01)

(58) Field of Classification Search
CPC .......... G06F 17/3053; G06F 17/30867; G06F 16/24578; G06F 16/9535; H04L 12/66;
(Continued)

(56) References Cited

U.S. PATENT DOCUMENTS 6,259,969 B1 *   7/2001   Tackett ................. G06F 17/279
                                                                700/264
7,287,057 B2   10/2007   Lagarde et al.
(Continued)

FOREIGN PATENT DOCUMENTS

| EP | 2821943 A1 * | 1/2015 | ............... G06N 5/00 |
| WO | WO-2008049834 A2 * | 5/2008 | ............. G06N 3/006 |
| WO | 2015086493 A1 | 6/2015 | |

OTHER PUBLICATIONS

Steadman, Ian. "Science Fiction Is Full of Bots That Hurt People." IEEE Consumer Electronics Magazine, Oct. 2016, pp. 112-117. (Year: 2016).*

(Continued)

*Primary Examiner* — Phuong Thao Cao
(74) *Attorney, Agent, or Firm* — Jeffrey L. Ranck; Ranck IP Law

(57) ABSTRACT

Representative embodiments disclose mechanisms to automatically rank and select extensions triggered in a digital assistant. A sample set of extensions are executed against a set of curated queries in order to extract a set of features and/or statistics. The system trains a machine learning model based on the features and/or statistics to rank and select extensions based on their response to a query. New extension incorporated into the system are executed against a second set of curated queries to obtain a set of extracted features and/or statistics which are saved for use at runtime. At runtime, a query phrase received by the system triggers one or more tasks from extensions. Extracted features for the triggered extensions are combined with stored features/ statistics and at least a subset of the results presented to the trained ranking and selection model. The model ranks and selects appropriate tasks which are presented to the user.

20 Claims, 8 Drawing Sheets

(51) Int. Cl.
*G06Q 10/10* (2012.01)
*G06F 16/9535* (2019.01)
*H04L 12/28* (2006.01)

(58) Field of Classification Search
CPC .. H04L 12/2816; G06N 99/005; G06N 20/00; G06Q 10/10
USPC ........................................................ 707/709
See application file for complete search history.

(56) References Cited

U.S. PATENT DOCUMENTS

| | | | |
|---|---|---|---|
| 7,505,892 B2 | 3/2009 | Foderaro | |
| 8,078,617 B1* | 12/2011 | Neveitt | G06F 16/335 707/732 |
| 8,290,038 B1* | 10/2012 | Wang | H04N 19/139 375/240.02 |
| 8,402,543 B1 | 3/2013 | Ranjan et al. | |
| 8,788,263 B1 | 7/2014 | Richfield | |
| 8,818,926 B2 | 8/2014 | Wallace | |
| 9,015,049 B2 | 4/2015 | Baldwin et al. | |
| 9,104,733 B2* | 8/2015 | Gao | G06F 16/24578 |
| 9,641,686 B1* | 5/2017 | Johansson | H04M 3/5235 |
| 9,720,981 B1* | 8/2017 | Boguraev | G06F 16/2423 |
| 9,806,942 B2* | 10/2017 | Saxena | H04W 4/50 |
| 2006/0235742 A1* | 10/2006 | Castellanos | G06Q 10/04 705/7.29 |
| 2007/0124263 A1 | 5/2007 | Katariya et al. | |
| 2008/0046394 A1 | 2/2008 | Zhou et al. | |
| 2009/0024607 A1* | 1/2009 | Sun | G06F 16/334 |
| 2009/0235356 A1 | 9/2009 | Jensen et al. | |
| 2010/0169323 A1* | 7/2010 | Liu | G06F 16/334 707/748 |
| 2010/0185623 A1* | 7/2010 | Lu | G06F 16/951 707/748 |
| 2010/0250523 A1* | 9/2010 | Jin | G06F 16/951 707/723 |
| 2010/0325105 A1* | 12/2010 | Guo | G06F 16/957 707/723 |
| 2011/0029517 A1* | 2/2011 | Ji | G06F 16/951 707/734 |
| 2011/0078105 A1 | 3/2011 | Wallace | |
| 2011/0208714 A1* | 8/2011 | Soukal | H04L 63/1425 707/709 |
| 2011/0314011 A1* | 12/2011 | Buehrer | G06F 16/951 707/728 |
| 2012/0078888 A1* | 3/2012 | Brown | G06F 17/30654 707/723 |
| 2012/0084293 A1* | 4/2012 | Brown | A61B 5/00 707/741 |
| 2012/0294511 A1* | 11/2012 | Datta | G06K 9/00771 382/155 |
| 2013/0073972 A1* | 3/2013 | Yung | G06Q 50/01 715/738 |
| 2013/0282703 A1* | 10/2013 | Puterman-Sobe | G06F 16/30 707/723 |
| 2013/0311997 A1* | 11/2013 | Gruber | G06Q 10/10 718/102 |
| 2014/0019522 A1* | 1/2014 | Weng | G06F 17/30964 709/203 |
| 2014/0244712 A1* | 8/2014 | Walters | H04L 67/10 709/202 |
| 2014/0250195 A1 | 9/2014 | Capper et al. | |
| 2014/0279995 A1* | 9/2014 | Wang | G06F 16/3334 707/706 |
| 2014/0280087 A1* | 9/2014 | Isensee | G06F 16/2455 707/723 |
| 2014/0337372 A1* | 11/2014 | Lee | G06F 8/30 707/767 |
| 2014/0351246 A1* | 11/2014 | Guo | G06F 16/24578 707/723 |
| 2015/0121216 A1* | 4/2015 | Brown | G06N 3/006 715/707 |
| 2015/0142420 A1 | 5/2015 | Sarikaya et al. | |
| 2015/0154644 A1* | 6/2015 | Saxena | G06Q 30/0269 705/14.66 |
| 2015/0156061 A1* | 6/2015 | Saxena | H04W 4/50 715/733 |
| 2015/0169631 A1* | 6/2015 | Gu | G06F 16/50 707/723 |
| 2015/0185996 A1 | 7/2015 | Brown et al. | |
| 2015/0186155 A1* | 7/2015 | Brown | G06F 3/04817 715/706 |
| 2015/0186156 A1* | 7/2015 | Brown | G06F 3/04817 715/706 |
| 2015/0289203 A1* | 10/2015 | Zhang | H04W 64/006 455/436 |
| 2015/0347414 A1* | 12/2015 | Xiao | G06N 7/00 707/749 |
| 2016/0042359 A1 | 2/2016 | Singh | |
| 2016/0044380 A1* | 2/2016 | Barrett | H04N 21/4826 725/53 |
| 2016/0094492 A1 | 3/2016 | Li et al. | |
| 2016/0110422 A1* | 4/2016 | Roytman | G06N 5/00 706/12 |
| 2016/0188565 A1 | 6/2016 | Robichaud et al. | |
| 2016/0225370 A1 | 8/2016 | Kannan et al. | |
| 2016/0335532 A1* | 11/2016 | Sanghavi | G06N 3/006 |
| 2016/0371170 A1* | 12/2016 | Salunke | G06F 11/3612 |
| 2017/0039483 A1* | 2/2017 | Cheng | G06N 5/04 |
| 2017/0124078 A1* | 5/2017 | Malik | G06F 16/951 |
| 2017/0171139 A1* | 6/2017 | Marra | H04L 51/32 |
| 2017/0193057 A1* | 7/2017 | Yi | G06F 16/335 |
| 2017/0242860 A1* | 8/2017 | Souche | G06N 5/043 |
| 2017/0250935 A1* | 8/2017 | Rosenberg | H04L 51/16 |
| 2017/0250936 A1* | 8/2017 | Rosenberg | H04L 51/18 |
| 2017/0269972 A1 | 9/2017 | Hosabettu et al. | |
| 2017/0270431 A1* | 9/2017 | Hosabettu | G06F 9/4881 |
| 2017/0278084 A1* | 9/2017 | Kumra | G06Q 20/12 |
| 2017/0293834 A1* | 10/2017 | Raison | G06F 17/30654 |
| 2017/0295114 A1* | 10/2017 | Goldberg | H04L 51/02 |
| 2017/0351709 A1* | 12/2017 | Kong | G06F 16/951 |
| 2017/0358299 A1* | 12/2017 | Schlesinger | G06F 17/28 |
| 2017/0358305 A1* | 12/2017 | Kudurshian | G06F 17/30746 |
| 2017/0372436 A1* | 12/2017 | Dalal | G06N 5/022 |
| 2018/0013844 A1* | 1/2018 | Foged | H04L 51/32 |
| 2018/0025085 A1* | 1/2018 | Sarangi | G06F 3/0482 707/722 |
| 2018/0032505 A1* | 2/2018 | Hoetzer | G06N 7/005 |
| 2018/0047071 A1* | 2/2018 | Hsu | G06Q 30/0282 |
| 2018/0052884 A1* | 2/2018 | Kale | G06N 5/04 |
| 2018/0075146 A1* | 3/2018 | Petrescu | G06F 17/3053 |
| 2018/0096283 A1* | 4/2018 | Wang | G06Q 10/063112 |
| 2018/0150524 A1* | 5/2018 | Anger | G06F 17/30867 |
| 2018/0181558 A1* | 6/2018 | Emery | G06F 17/279 |
| 2018/0308473 A1* | 10/2018 | Scholar | G06F 17/21 |

OTHER PUBLICATIONS

"International Search Report and Written Opinion Issued in PCT Application No. PCT/US2017/054811", dated Dec. 18, 2017, 13 Pages.
"Skype Bots preview comes to consumers and developers", Published on: Mar. 30, 2016 Available at: http://blogs.skype.com/2016/03/30/skype-bots-preview-comes-to-consumers-and-developers/.
"A gif of multiple Facebook 'ChatBots' in action", Published on: Jul. 27, 2016 Available at: https://www.reddit.com/r/Design/comments/4m75xp/a_gif_of_multiple_facebook_chatbots_in_action/.
Dreilinger, et al., "Experiences with Selecting Search Engines Using Metasearch", In Journal of ACM Transactions on Information Systems, vol. 15, Issue 3, Jul. 1, 1997, pp. 195-222.

* cited by examiner

DIGITAL ASSISTANT EXTENSION AUTOMATIC RANKING AND SELECTION

FIELD

This application relates generally to extensions for digital assistants. More specifically, embodiments disclosed herein utilize machine learning to automatically rank and select digital assistant extensions.

BACKGROUND

Digital assistants have been making inroads in various aspects of people's lives. The purpose of these digital assistants is to make the life of the user easier by automating tasks, performing various tasks on behalf of a user, and surfacing important information. The currently available digital assistants rely on a narrow set of information or commands. Since digital assistants reside in closed environments, the owner of the digital assistant is responsible for evolving the narrow set of information or commands applicable to a particular digital assistant.

It is within this context that the present embodiments arise.

DETAILED DESCRIPTION

Figure 1:
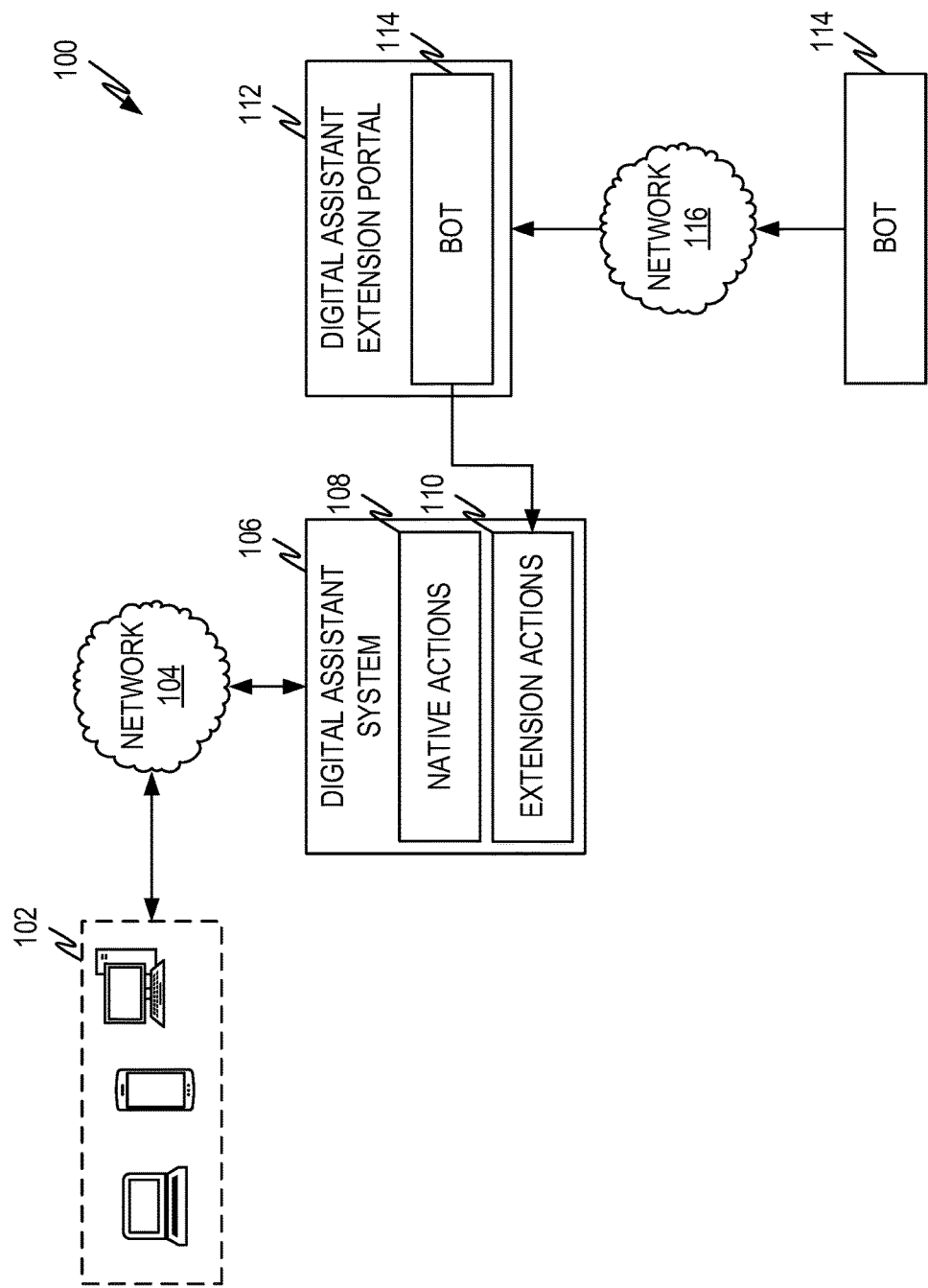
FIG. 1 illustrates an example architecture of a digital assistant system according to aspects of the disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

The whole purpose of digital assistants is to bring information to the attention of a user and to perform tasks on behalf of a user. In the context of this disclosure a digital assistant is a system, collection of systems, service, collection of services, and/or combinations thereof that collect information from or about a user, provide tips to the user, and/or perform various tasks on behalf of the user.

Thus, users want and expect digital assistants to provide a wide variety of services and perform a wide variety of tasks. For example, a digital assistant that is able to book a flight, make reservations, follow up on packages, order items, pay bills, and a wide variety of other tasks is valuable to a user. Each of these tasks tends to reside in a particular domain. Rather than developing services and capabilities in every domain of interest to a user, manufacturers of digital assistants can open them up to third party extensions. These extensions can enrich and/or extend the domains and tasks within a domain in order to improve the functioning and utility of a given digital assistant. Extensions are provided in the form of executable instructions and/or data are used to extend the functionality of a digital assistant. In this disclosure, extension functionality is provided by "bots" which refers to the executable instructions and data (if any) provided by a developer and which is incorporated into the digital assistant. Conceptually, built in functionality can also be considered to be provided by bots, although in some embodiments, the architecture of the built in functionality is somewhat different than a developer provided bot used to extend the functionality. However, the disclosed embodiments apply to both bots that provide extension functionality and built-in functionality. Thus, unless otherwise indicated in a particular section, the term "bots" will be used to refer to both extension bots and the executable instructions that provide built-in functionality.

A bot (extension or built-in) of the digital assistant may accomplish one or more "tasks" on behalf of the user. A single bot can accomplish one or more tasks. The tasks provided by a bot trigger on a set of "intents." In this context an intent is something the user intends to accomplish like "set a reminder" or "order pizza" and can be derived from a query that the user submits like "remind me to schedule lunch with Kisha next Thursday" or "can you order me some food?" or can be derived as explained below from one or more signals monitored by the system on behalf of the user. Intents reside in one or more domains, based on the type of event/activity they are intended to trigger, like a reminder domain, an order domain, and so forth. Thus, a query submitted to a digital assistant is turned into one or more intents, which reside in one or more domains. Language understanding models convert submitted queries into one or more intents. In some embodiments, a developer has the option of using predefined intents or creating a new custom intent model based on sample queries and rules. In the context of this disclosure, the term "query" will be used to encompass any request, question, and so forth submitted by a user to a digital assistant in whatever form.

Opening up a digital assistant to third party extensions brings with it its own set of problems. For example, where bots contain their own intent models, it can be difficult or impossible to identify when a bot will be invoked (i.e., what set of queries will trigger the bot). Depending on the care and quality of the bot, the bot may suffer from a variety of issues such as over triggering (i.e., trigger when a user would not want it to trigger), under trigger (i.e., not triggering when a user would want it to trigger), initiate an incorrect action/mistakenly trigger (i.e., trigger an order food action when the intent of the user was to set a reminder to order food), have a "bad" user interactive experience, and so forth. Independent of any issues that may arise from the bot itself are other issues that can arise simply by the existence of extension bots. For example, when multiple bots and/or built in functionality all want to trigger on the same user intent, how should the triggered bots be ranked? Should all the options be presented to a user? Furthermore, the digital assistant system often does not know the relationship between the extensions and the built in functionality (i.e., whether a bot will be used to provide a different functionality or the same functionality as what is built-in).

Embodiments of the present disclosure apply machine learning techniques to automatically select and rank extensions and built in functionality in order to fill a request (i.e., query) from a user. A model for ranking and selecting triggered bots is created from applying machine learning techniques to a representative set of bots and a set of curated queries.

The representative set of bots are selected from bots that exist in the system and/or bots that are created to mimic built-in functionality. The bots are selected to provide a representative cross-section of domains, tasks, and so forth. The set of curated queries are created to identify various aspects of the bots. The curated queries are run against the set of bots. The result is a set of features that describe various aspects of the bots. The output is used to train a machine learning model that is designed to rank and select one or more bots that are triggered by received queries. The curated query set can be quite large and is designed to ensure that the ranking and selection model is effectively trained. In addition, the features can be stored so they are available to the system in a runtime situation.

When a new bot is to be added to the digital assistant, such as via submission through an extension portal, the new bot is run through a set of curated queries in order to gather the same features. The set of curated queries used in this process can be the same as, similar to, or completely different from, the set of curated queries used to train the ranking and selection model. Typically, the set of curated queries will differ from the set of training curated queries at least in some fashion. The features are also stored in a data store for access during runtime of the digital assistant.

During runtime, as a user submits a query, the digital assistant will apply its language understanding model to derive one or more intents associated with the query. Additionally, the query can be applied to bots that utilize their own intent model. The extensions and/or built-in functionality that trigger tasks are evaluated and features are compared to the features in the data store to identify the closest match. The matched features are then passed to the ranking and selection model previously created. The ranking and selection model ranks and selects those tasks (i.e., provided by some subset of the triggered bots) that should be presented to the user and the selected tasks are presented to the user.

In this way, as new extensions are added to the digital assistant system, their behavior can be not only automatically integrated with built-in functionality and existing extensions, but the behavior of extensions can be modified (i.e., by the ranking and selection model) in order to present a more seamless user experience.

DESCRIPTION

FIG. 1 illustrates an example architecture 100 of a digital assistant system 106 according to aspects of the disclosure. The figure illustrates how digital assistants 106 in the disclosure can be extended by add on functionality. A developer submits a bot 114 providing one or more tasks to a digital assistant extension portal 112, typically over a network 116. The digital assistant extension portal 112 takes in the bot 114 and performs tests and any other functions that are required before approval to deploy the bot 114 is received. These can include a wide variety of tests to ensure that the bot functions properly (i.e., no execution errors) as well as security checks, and so forth.

As discussed below, one aspect in accordance with the present disclosure is to collect features to see how the submitted bot responds to a collection of curated queries and to collect description information about the bot. The description information allows the bot to be integrated into the digital assistant. The features allow the system to understand how the bot fits in with the rest of the functionality already in the digital assistant (whether natively or through extensions) and to identify what sort of intents the bot triggers on. It also allows the bot to be tested for over triggering, under triggering, mis-triggering and other such problems discussed above. It further allows identification of how the bot performs in representative "dialogs" with a user and determine whether the bot appropriately responds to follow on queries. Thus, a representative dialog might be:

User: "I'm hungry"
Assistant: "would you like me to order you some food?"
User: "remind me to order food at 12:30"
Assistant "I'll remind you."

In this dialog the Assistant correctly interprets a need the user has, such as an intent to eat, and correctly interprets the user's further specified intent not to eat now, but to be reminded at a later time. Thus, in addition to a single query aspect (i.e., a query that triggers an indicated response by the bot), the set of curated queries can contain a series of queries to profile how a bot responds to follow on query dialogs. In effect, running the set of curated queries against the bot prior to deployment allows the system to build a profile of the behavior of the bot and to gather characteristics of the bot prior to deployment and thus be able to correctly prioritize the bot's response against other bots that provide the same or similar tasks.

Once the system performs any desired tests and collects the description information and the features, the bot 114 is deployed to the digital assistant 106 where it provides extension action(s) 110 along-side the built in native actions 108.

A user 102 submits one or more queries to the digital assistant 106, generally over a network 104 (which could also be the same network as network 116). The digital assistant 106 determines one or more user intents associated with the submitted query and provides an appropriate response to the query. This process is discussed in greater detail below.

Figure 2:
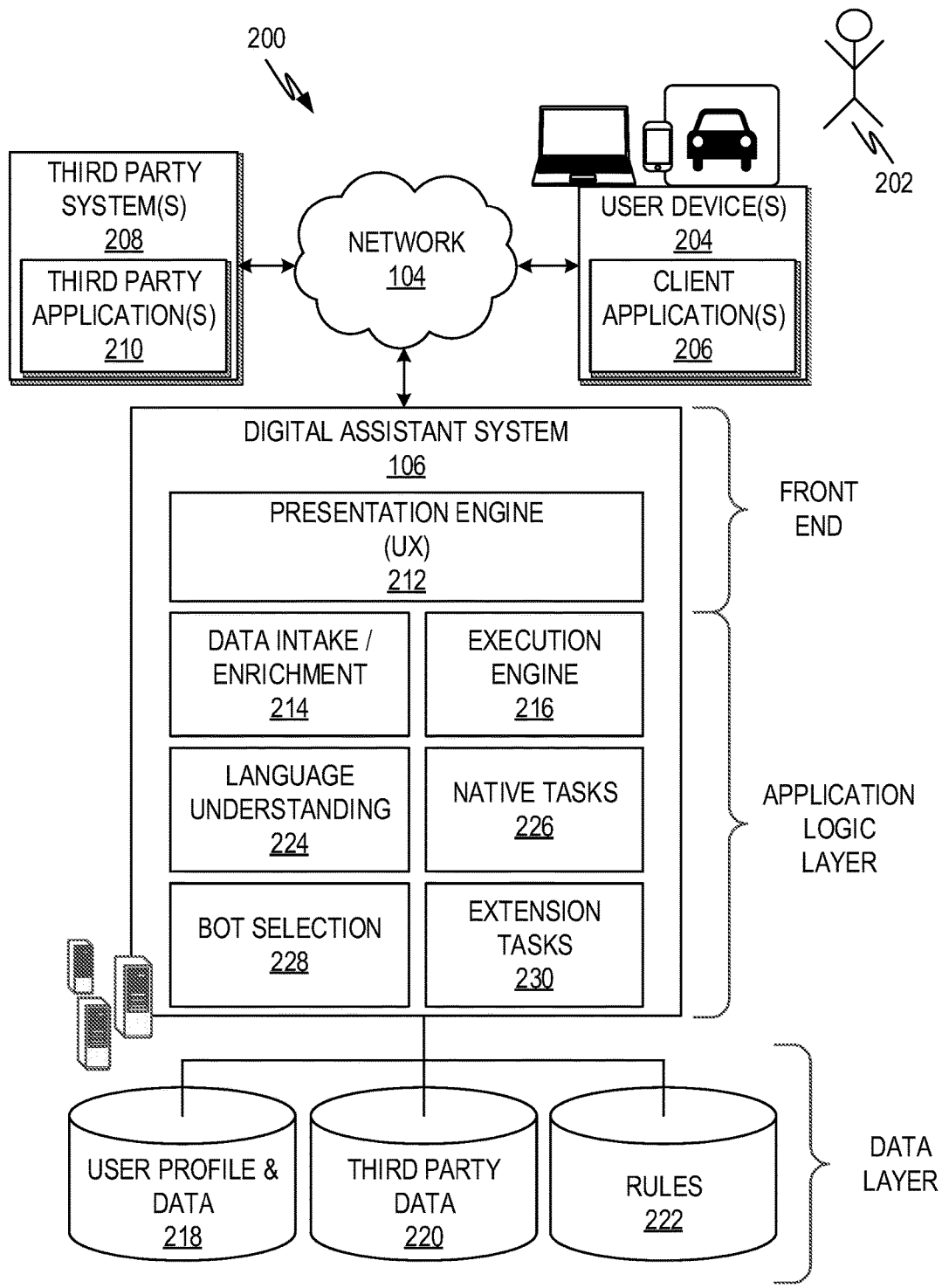
FIG. 2 illustrates another example architecture of a digital assistant system according to aspects of the disclosure.

FIG. 2 illustrates another example architecture 200 of a digital assistant system according to aspects of the disclosure. Such an architecture shows one possible embodiment where the various aspects of a digital assistant system, such as digital assistant system 106, can be implemented in a three-tiered architecture, comprising a front-end layer, an application logic layer and a data layer. Such an architecture is only one type of cloud and/or server architecture which would be suitable for the disclosed embodiments and numerous other models and architectures could also be used. For example, more recently many services and applications are developed using a microservice architecture so that they can be deployed and executed on clusters of systems and/or service fabrics. However, the three-tiered architecture is sufficient for explanation purposes and those of skill in the art would be able to understand how to implement the digital assistant architecture in other environments from the explanation provided.

As is understood by skilled artisans in the relevant computer and internet-related arts, each module or engine shown in FIG. 2 represents a set of executable software instructions and the corresponding hardware (e.g., memory and processor) for executing the instructions. To avoid obscuring the disclosed subject matter with unnecessary detail, various functional modules and engines have been omitted from FIG. 2.

As shown in FIG. 2, the front end layer comprises a presentation engine 212 which can include one or more software and/or hardware implemented modules. The presentation engine is responsible for the user experience (UX) and receives information and/or requests from various client-computing devices including one or more user device(s) 204, and communicates appropriate responses to the requesting device. Thus, the presentation engine 212 can cause presentation of information (e.g., cards, responses, etc.), user interfaces, and so forth on the user devices 204, generally through the client application(s) 206.

In this embodiment, user devices 204 can include various devices can include devices such as a wearable device (i.e., watch, band, glasses, and so forth), a carry-able device (i.e., mobile phone, tablet, laptop, and so forth), a stationary or semi-stationary device (i.e., portable computer, desktop computer, hub, and so forth), and/or server devices and/or services (i.e., servers, cloud services, calendar systems, email systems, and so forth). In addition, one more vehicles can be considered user devices in the context of the embodiment of FIG. 2, even though such vehicle(s) may be associated with different users at different times, such as where a vehicle is shared by more than one user.

A user interacts with all of these devices and/or services and they all have information that can be used by the digital assistant system 102 to provide digital assistant services to the user. This data will be collectively referred to as user data and can include information related to the user as well as information about the user such as preferences, profile information and so forth. Example information includes, but is not limited to, a user's calendar and/or schedule, to do list, email history, purchase history, a user's normal routine, route to work, home location, work location, school location (i.e., for a student), preferred forms of communication, devices owned/interacted with, and so forth.

The user device(s) 204 may execute different client applications 206 that allow the device to communicate with the digital assistant system 106, typically through the presentation engine 212. Such applications can include, but are not limited to web browser applications, a digital assistant application, and/or client applications (also referred to as "apps") that have been developed for one or more platforms to provide functionality to present information to the user and communicate via the network(s) 112 to exchange information with the digital assistant system 106. Each of the user devices 204 may comprise a computing device that includes at least a processor, a display and communication capabilities with the network 112 to access the digital assistant system 106. One or more users 202 may be a person, a machine, or other means of interacting with the user device(s) 204. The user(s) 202 may interact with the digital assistant system 106 via the user device(s) 204. The user(s) 202 may not be part of the networked environment, but may be associated with user device(s) 204.

In accordance with privacy laws and with user authorization, the digital assistant system 106 can store and/or have access to a wide variety of data. As shown in FIG. 2, the data layer includes several databases and/or other types of data sores (collectively data stores), including a data store 218 for storing data associated with a user, such as user 202. The types of information that can be stored in such a data store, includes, but is not limited to, any user information discussed above.

The data layer can also include a third party data store, which stores information obtained from third parties, such as from third party system(s) 208 and/or third party application (s) 210. This information can be about the user, or may be information used by service actions to provide the service utilized with the service action. For example, if the service action further utilizes services provided by the third party system(s) 208 and/or third party application(s) 210, information allowing the interoperation between the digital assistant system 106 and the third party system(s) 208 and/or third party application(s) 210 may be stored in third party data store 220. Information gathered from other sources may also be stored in third party data store 220 in some embodiments.

Another data store in the data layer can contain rules 222 for the execution engine 216, the language understanding model 224, and/or other modules, components, bots, etc. to operate on. Such rules specify a set (combination) of input data, a set of conditions and a set of resultant output, such as user intents or actions that should be taken. In this context a set can consist of one or more items (i.e., one or more input data, one or more conditions, and/or one or more resultant outputs). In other words, a rule defines a relationship between input data and resultant output(s). An example rule might be that when a user is within a threshold time from an appointment, then send a card to the user reminding the user to leave for the appointment. This example rule defines a relationship between user information (the user with the appointment, the appointment), and a resultant action (send a reminder to leave for the appointment). Conditions can be implied, derived, or express, such as when the time within a designated threshold. Another example rule might be when a user input query contains some form of the term "reminder" the reminder intent should be set.

The digital assistant system 106 also comprises data intake and/or enrichment modules 214. As data is received, the data can be processed in a variety of ways, including any combination of pre-processing operations such as validation, cleaning, normalization, transformation, feature extraction, selection, and so forth. Validation and/or cleaning generally includes of detecting and correcting data or removing data that is corrupt, inaccurate, incomplete, etc. Validation also ensures that data is of the proper type. Normalization generally includes ensuring data is scaled appropriately, redundancies are removed, and so forth. Transformation includes mapping data from one set to another, such as when data from various sources are mapped to an equivalent data set (i.e., where part numbers from different manufacturers are transformed with a standard part numbering system) and so forth. Feature extraction includes identifying and extracting various pieces of relevant information is sometimes related to machine learning. Feature extraction can also involve reducing the dimensionality of a data set. Selection includes selecting a subset of relevant features that are of interest. Other pre-processing may also be used as appropriate.

The data intake and/or enrichment module 214 may also perform data enrichment. Data enrichment often correlates information from different sources and assembles it in a way that the data becomes enriched with (i.e., related to) other information. For example, user information from multiple sources can be assembled in one or more associated data structures. The assembled information can then allow the digital assistant system to identify where a user is, what activities the user is engaged in, and so forth.

The data intake and/or enrichment module 214 can receive and assemble information from a variety of source, represented in FIG. 2 by the third party system(s) 208, the third party application(s) 210, the user device(s) 204 and other sources. By way of example only, the third party application(s) 210 and/or the third party system(s) 208 can represent services like email, scheduling/calendaring, and other such services. The third party application(s) 210 and/or the third party system(s) 208 can also be systems used by bots that provide extension services to fill user requests. For example, a bot may utilize a flight reservation system when the user requests the assistant to book a flight to a destination on a particular date. The third party application(s) 210 and/or the third party system(s) 208 can also represent other inference systems like hubs which assemble information and make inferences. These can infer things like home/work/school location and activities, travel context, location and visiting patterns, route patterns, meeting contexts, communication contexts, emergency information, search contexts and so forth. Of course given the raw data, the digital assistant system 106 can also make such inferences in some embodiments.

The digital assistant system 106 comprises a language understanding model 224. The language understand model 224 is responsible for taking an input query and for identifying one or more intents from the input query. The language understanding model can associate a confidence level (also referred to as a confidence score) with the identified intents. The confidence level represents the confidence that the input query maps to the identified intent. Prior to being passed to the language understanding model 224, input queries can be placed into a format suitable for processing by the language understanding model 224. For example, queries received in audio format (voice, etc.) can be converted to text or some other desired format prior to being passed to the language understanding model 224.

The digital assistant system 106 also comprises an execution engine 216. The execution engine 216 receives intents from the language understanding model 224 and/or from other executable instructions and identifies which bots are triggered by the intent. The bot can trigger not only on the intent, but the intent/confidence level combination. In some embodiments, a bot may not trigger if a given intent has a confidence level below a threshold, but may trigger above that threshold. In other embodiments, confidence level is not used and the response selection and ranking model appropriately handles any ambiguity.

The query/response model represents operation of the digital assistant system 106 when the system is acting in a reactive mode. However, the digital assistant system 106 can also operate in a proactive mode. In the proactive mode, the system can monitor the data (current context of the user and/or other signals or events) and proactively take action (i.e., engage the user in some fashion) without the user initiating the action, such as through a query. For example, by accessing the user's calendar, travel schedule and/or flight information, the digital assistant system 106 may know that the time to check-in for the user's flight has arrived. The digital assistant can proactively engage the user with a reminder (i.e., time to check in), with a request (i.e., it is time to check in, should I do that for you?), or in some other way. In yet another example, if the user is browsing restaurants, the digital assistant 106 my step in and ask whether the user would like recommendations for a restaurant, make reservations, and so forth.

The execution engine can also monitor incoming data and provide insights as part of the trigger identification process. Insights, as used herein, are a specific piece of information about a user that the system has permission to access and/or deduce about a user or set of users (i.e., from data about or related to the user). Insights can be representative of a particular context and/or activity of the user such as in a meeting, operating a vehicle, browsing the internet, working, at a store, on vacation, and so forth.

The insight(s) and/or intent(s) trigger bots/built-in functionality of the digital assistant 106. These are represented, for example, in FIG. 2 by the native tasks 266 and the extension tasks 230. Once the bots/built-in functionality are triggered, the task selection operation 228 ranks and selects the tasks and finalizes the response to the user, as described below.

Figure 3:
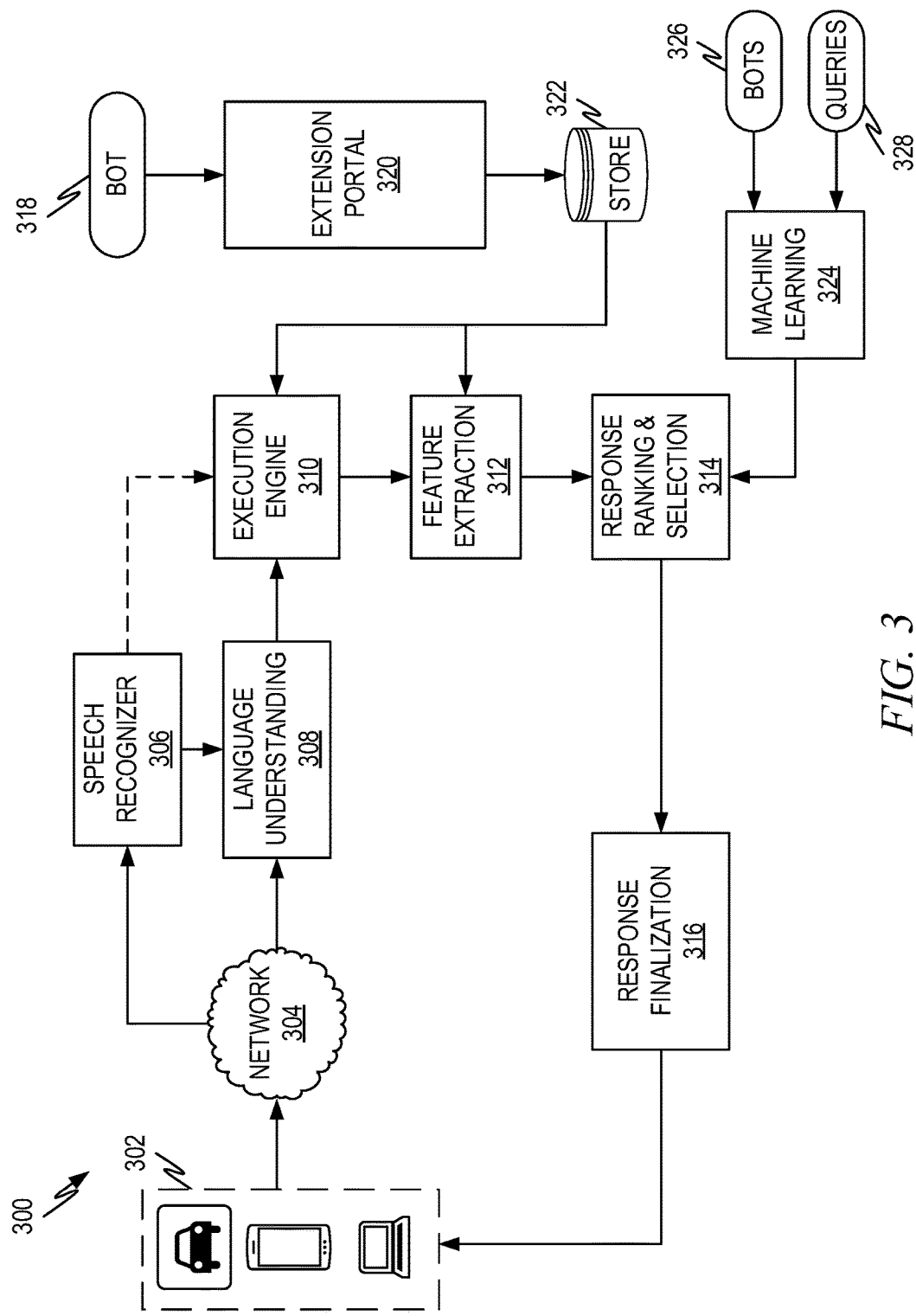
FIG. 3 illustrates an example architecture for a digital assistant system with automatic ranking and selection of bots.

FIG. 3 illustrates an example architecture 300 for a digital assistant system with automatic ranking and selection of bots. During runtime, a user will use a device 302 to submit a query to the digital assistant system, typically via a network 304 as previously explained. The query will be converted to a format desired by the language understanding model 308. For example, if the query is audio (voice, etc.), the query can be converted by a speech recognizer 306 that performs speech to text conversion and places the text into the format desired by the language understanding model 308.

The language understanding model 308 produces one or more insights corresponding to the query. These insights are passed along to the execution engine 310. As previously discussed, execution engine 310 can also provide insights as part identifying which bots are triggered by the query and/or insights. However, for ease of description and to avoid repetition of the phrase "queries and/or insights" or the phrase "intents and/or insights," the description will be presented in terms of a bot being triggered by a query. However, in all embodiments described herein, the trigger by query/intent also includes triggering by intent as previously described.

The execution engine 310 identifies the bots that are triggered by the query. Additionally, the query can be passed directly to those bots that use their own language understanding model. The execution engine 310 identifies bots triggered by the query by identifying those bots that trigger on a particular insight/query combination and/or by presenting the query to those bots that use their own language understanding model. Bots are triggered when they indicate that they want to handle the query.

In identifying the bots that are triggered, the execution engine can make use of definitions and other information in data store 322. The definitions in data store 322 help define the various tasks and experience provided by the bots. Thus, the data store 322 holds the list of experiences (i.e., bots and/or domains), task descriptions, and so forth used by the execution engine 310.

In addition, the execution engine 310 extracts features from and/or about the triggered bots. The execution engine 310 extracts the features related to the following:

features computed looking at how one specific bot responded to the specific query, including the language understanding model outputs;

features computed looking at how all the activated bots responded to the specific query, including the language understanding model outputs;

features computed looking at the statistics of one specific bot; and features computed looking at the statistics of all the activated bots.

Representative statistics from which features are computed are (i.e., in the last two bullets above) are discussed below. Additionally, in some embodiments, a model may be used to convert the output of a bot into "normalized" data before the statistics and/or features are extracted. The above features and examples thereof are discussed below.

The feature extractor 312 identifies features that have been pre-calculated (as explained below) and that are associated with the triggered bots. As discussed below, features are calculated when a bot is presented for deployment and these features are used, in conjunction with the features above, to identify how the bot should be ranked and whether the bot should be selected. The feature extractor 312 retrieves the features associated with the individual triggered bots from data store 322, combines the retrieved features with the features from execution engine 310 and presents the features and/or subset thereof to the response ranking and selection model 314. In some embodiments a closest matching set (i.e., using a distance measure) is retrieved from data store 322. In this disclosure a subset includes a proper subset (i.e., the complete set). This model is created through a machine learning process as described below and maps the presented features to a ranking for the triggered bot.

The output of the model is a ranked list of the triggered bots. The ranking assigned to a triggered bot can be an absolute or relative ranking. Absolute rankings effectively place the ranked bots into "buckets" that represent different treatment of the triggered bots. For example, one bucket can signal to the selection logic that the triggered bot would be suitable for presentation to the user (i.e., that the bot has appropriately triggered and would be appropriate to present to the user in response to the query) while another bucket can signal that the triggered bot would not be suitable for presentation to the user in response to the query for some reason. Relative rankings place the triggered bots into a list by order of some metric, such as confidence level that the triggered bot would meet with acceptance by the user (i.e., triggered as it was supposed to and provides a task appropriate to the query), whether the task provided by the bot is favored by the user (i.e., based on a user profile or other data), or some other metric.

Additional selection logic can be applied to select a subset of the ranked list to present to the user. The selection logic can account for various aspects, such as user profile data, a maximum number of choices that should be presented to the user, some cost metric, or other criteria. As a representative example, suppose the request was to book a flight. Triggered bots include bot A that uses a particular booking service and bot B that uses another booking service. The feature extractor 312 identifies the features associated with the two bots and present a subset to the ranking and selection model 314. Suppose the ranking and selection model 314 ranks them as bot B and then bot A in a relative ranking list.

In a first instance, the user has not indicated a preference for a booking service and the maximum number of choices that the system will present to a user is 3. In this instance, the response back to the user will as the user to pick a booking service to use. Depending on the user's choice, the selected bot will be invoked and the ticket booked.

In a second instance, the user has indicated a preference for the booking service used by bot A. In this instance the response back to the user may indicate that the ticket will be booked using the booking service associated with bot A and the system will invoke bot A to book the service.

In both these instances, additional selection logic can be applied either to select the bot(s) will be used to finalize the response. This can be performed by the response ranking and selection model 314 and/or the response finalization operation 316. Once the bot(s) have been selected the response finalization operation 316 prepares the information and presents it to the user in an appropriate format, such as previously described.

As should be evident by this discussion, the ranking and selection model 314 has the effect of not only identifying the bots that should provide the tasks to the user, but also has the effect of modifying the behavior of the bots. Thus, if a bot triggers when it should not, as the features for that bot are applied to the ranking and response model, the model will rank the bot in a manner or otherwise indicate that it should not have triggered and should not be presented as part of the response. This has the effect of modifying the behavior of the bot and of bringing unruly bots in line with how they should operate in an automatic way.

As discussed more completely in conjunction with FIG. 5 below, bots 318 used to extend the functionality of the digital assistant are submitted via an extension portal 320 which applies any acceptance/approval process (testing for errors, etc.) as well as using a set of curated queries to gather the features (stored in the data store 322) discussed above that are used by the response ranking and selection model 314 to rank and select the triggered bots as previously described.

As discussed more completely in conjunction with FIG. 4 below, a sample set of bots 326 and a curated set of queries 328 are used by a machine learning method 324 to produce the ranking and selection model used by response ranking and selection 314.

Figure 4:
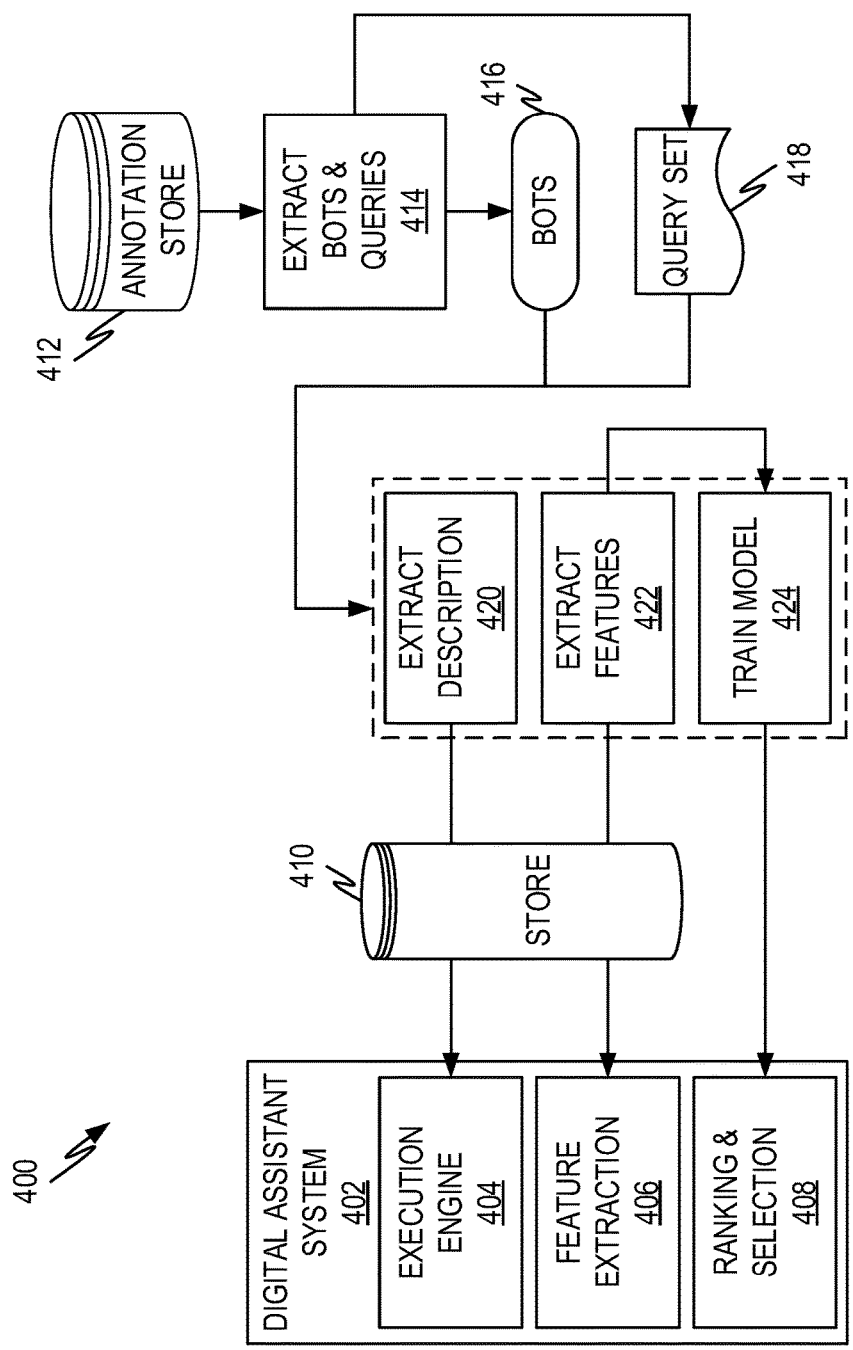
FIG. 4 illustrates an example architecture for training a ranking and selection model.

FIG. 4 illustrates an example architecture 400 for training a ranking and selection model. As previously described a digital assistant system 402 comprises an execution engine 404, a feature extractor 406 and a ranking and selection model 408. The functions of these blocks have been previously described and there is no need to reiterate what these blocks do in the runtime digital assistant 402.

The annotation store 412 contains a representative set of bots 416 and a set of curated queries 418 that are used to train the ranking and selection model 408 as explained below. The bots and queries extraction function 414 retrieves the representative set of bots 416 and the curated queries 418 from the annotation store 412. Curated queries, also sometimes referred to as annotated queries, are queries chosen to gather the features previously referred to. The details of representative features are presented below. The queries are curated in the sense that they are selected to gather the feature information needed to build a "profile" on how a particular bot operates. Queries can include single queries such as a query that should trigger an action all by itself ("schedule an appointment with my doctor for Friday at 2 pm") as well as a set of queries and follow on queries that together represent a conversation under the hypothesis that a specific response (i.e., by the bot) is accepted and presented to the user. An example might be the exchange:

User: "Can you schedule me a doctor appointment?"
Assistant: "This would be your primary care physician: Dr. Wallenberg?"
User: "Yes."
Assistant: "When would you like the appointment scheduled?"
User: "Friday at 2 pm"

Assistant: "Your appointment has been scheduled and placed on your calendar."

For bots that use customized language understanding models (instead of the built in LU model), the queries can contain a variety of queries used to gather statistics on how the LU model behaves and/or what type of queries trigger the bot. These statistics become part of the features that are used to train the ranking and selection model.

Operation 420 extracts descriptions (also referred to as definitions) that describe the bots. The descriptions are stored in a data store, for example in data store 410, in some embodiments. The data store 410 may be the same data store as the data store 322 of FIG. 3. The descriptions allow the data store 410 to contain the list of tasks, their descriptions and so forth that are used by the execution engine 404 during operation to identify the bots triggered by a query/intent(s).

Operation 422 extracts the features discussed herein that are used to train the ranking and selection model. The features may include, but are not limited to, one or more of:
1. Features extracted from the language understanding results (for each single possible response in the curated query set and for all possible responses altogether in the curated query set). Examples include but are not limited to: the minimum, maximum, average, sum of the language understanding model confidence scores, the number of different domains identified, the number of intents identified, the number of entities detected across all choices, and/or the number of entities detected for a bot.
2. Features extracted from how well a conversation progress under the hypothesis that a specific response is accepted and presented to the user (whether the bot triggers when it should and whether the response to the query was appropriate as determined from the curated query set). Examples include but are not limited to: the number of new entities filled, the number of entities revisited, whether confirmation is asked, whether the task triggered was a repeat question action, whether the task was triggered a new question action, and/or the dialog state confidence increase.
3. Features extracted from the statistics collected for the various models used by the various tasks activities of this/these bot(s). Examples include, but are not limited to: predicted general precision, predicted general recall, expected precision for the current language understanding model result, and/or estimated semantic confidence rescaling factor.
4. Features extracted from the bot configuration. Examples include, but are not limited to: number of tasks the bot performs, number of parameters in the task, type of LU models used, type of queries used, etc.
5. Features extracted from the input source: speech-recognition-level features for voice, textual characteristics features for text queries, other-modality specific information in the case other modalities are used (gesture, ink, button press, etc.).

The statistics, like the other features above, are gathered by running the curated query set against the sample set of bots. The statistics may also comprise one or more of:
How often a bot is triggered by its own language use model (if it uses one);
Which intents/categories of intents trigger a bot;
The average confidence score of the queries that triggered the bot;
What is the confidence score distribution and/or probability density function;
Characteristics of the query that triggered the bot (long query, short query, etc.); and
How often does the model trigger on top of an existing intent we have in the system.

Operation 422 extracts the features by executing the curated query set 418 against the sample bots 416 and collecting the statistics and other information identified above. For some of the information above, the queries need not be executed and the information comes directly from either the queries 418 themselves, the bots 416, or both. For example, features extracted from the input source (i.e., #5) can be identified by either examining the curated queries 418 or by evaluating metadata (annotations, etc.) associated with the curated queries 418. Features extracted from the bot configuration (i.e., #4) can be identified by examining the bot configuration information and/or metadata associated with the bots. The extracted features can be placed in a series of feature vectors and stored in a data store 410 for use during runtime as previously explained. The data store 410 can be the same as data store 322 of FIG. 3.

The series of feature vectors are used to train the ranking and selection model via operation 424. In operation 424 a machine learning model is used on the input feature vectors to train the ranking and selection model. Any number of machine learning models are suitable for use in operation 424 and such models are well known. As representative examples only, the machine learning model can be one or more of a Bayesian model (Native Bayes, Basian Belief Network, Basian Network, Averaged One-Dependence Estimators, etc.), a decision tree model (classification and regression tree, chi-squard automatic interaction detection, conditional tree, etc.), a dimensionality reduction model (Principal Component Analysis, Partial Least Squares Regression, Projection Pursuit, Principle Component Regression, a discriminant analysis model such as quadratic, regularized, flexible, linear, Multidimensional Scaling, etc.), an instance based model (k-nearest neighbor, learning vector quantization, self-organizing map, locally weighted learning, etc.), a clustering method (k-means, k-median, expectation maximization, hierarchical clustering, etc.), deep learning model (deep Boltzmann Machine, deep belief networks, convolutional neural network, etc.), an ensemble model (random forest, gradient boosting machines, bootstrapped aggregation, etc.), a neural network model (radial basis function network, perception, back propagation, Hopfield network, etc.), a regularization model (ridge regression, elastic net, least angle regression, etc.), a rule system (cubist, one rule, zero rule, repeated incremental pruning to produce error reduction, etc.), a regression model (linear regression, least squares regression, logistic regression, etc.) or a model that is not classified in the above taxonomy such as support vector machine (SVM) or another model.

The process is used to bootstrap the learning model. Once the initial model is trained, as additional bots are submitted and additional statistics extracted as described below, the statistics can be used to adjust operation of the raking and selection model 408 either on a continuous or periodic basis. Thus, the statistics collected through bot submission can be applied to a machine learning technique to further train the model. In alternative embodiments, the model is trained on the representative set of bots 416 and the set of curated queries 418 and is not updated. Additionally, or alternatively, an updated set of representative bots 416 and/or an updated set of curated queries 418 can be used to update the training of the model.

The ranking and selection model is used by the ranking and selection component 408 of the digital assistant system 402 as described above, such as in FIG. 3.

Figure 5:
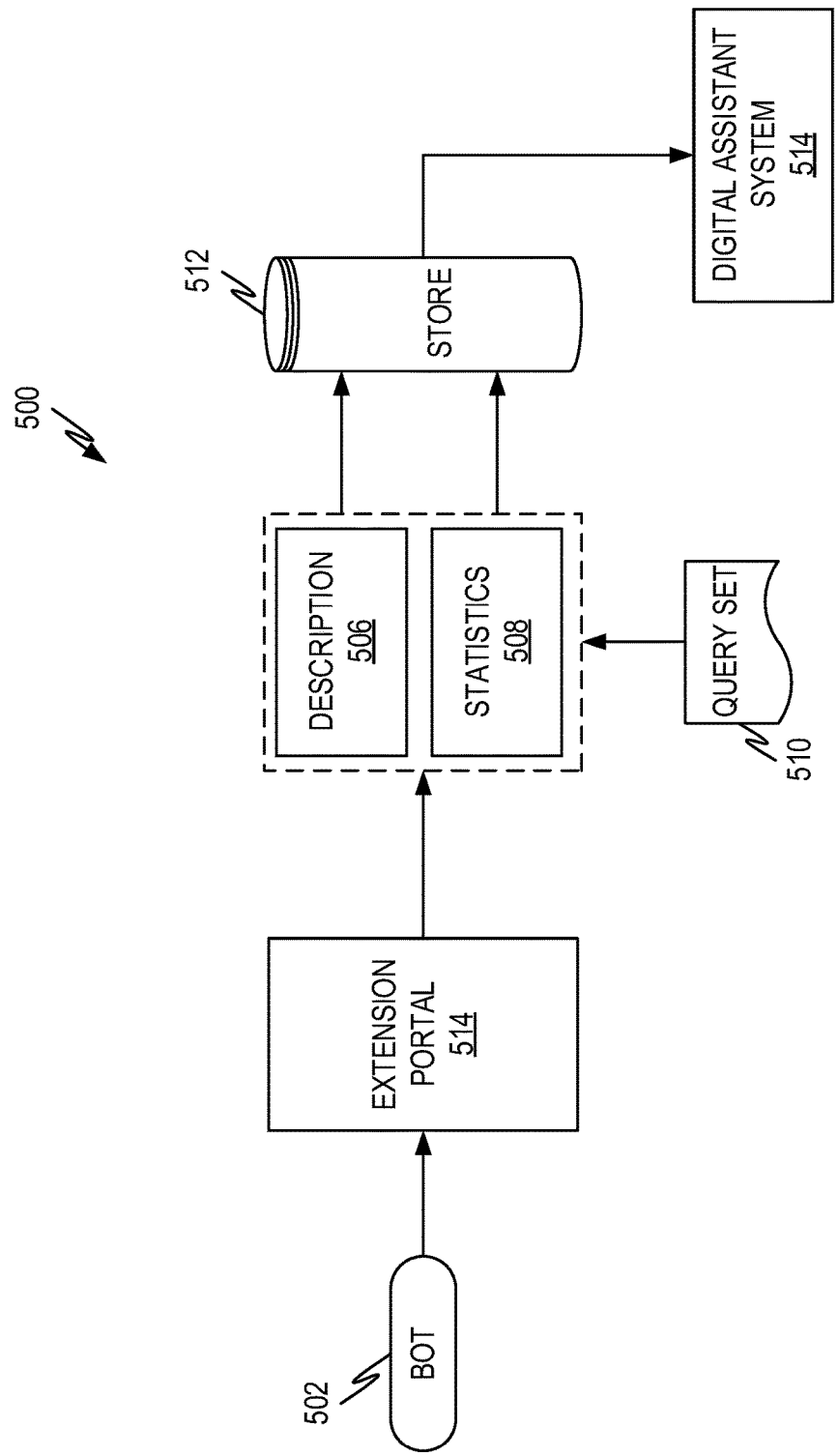
FIG. 5 illustrates an example architecture for collecting information on submitted bots.

FIG. 5 illustrates an example architecture 500 for collecting information on submitted extension bots 502. In other words, the example architecture 500 describes the processes used by an extension portal 504 (e.g., extension portal 320 or digital assistant extension portal 112) to collect information on submitted bots so they can be integrated into the system and be ranked/selected by the ranking and selection model. The portal may perform additional processes not shown or discussed here such as security checks, and any other checks that happen before deployment is made.

Bot 502 is submitted through the extension portal 504. When bot 502 is submitted, the developer defines the various intents and other information (e.g., insights) needed to perform their tasks. As previously discussed, the developer can rely on the built in LU model and the intents created thereby or can create a new custom LU model. In some embodiments, the custom model is created by giving example queries and/or rules. The queries/rules can be based on positive examples (i.e., trigger the bot when the query "book a flight" is received) or negative examples (i.e., do not trigger the bot when the query "book a flight" is received) or a combination of both.

When the bot is submitted, the extension portal 504 extracts description information 506 and features 508. This is accomplished by running a set of curated queries 510 against the bot. The set of curated queries 510 can be the same as, completely different from, or partially different from the set of curated queries 418 used to train the ranking and selection model as described in conjunction with FIG. 4 above. The description is extracted in the same fashion as the descriptions for the representative set of bots 416 above. In other words, the same operation 420 can be used by extension portal 504 to extract the appropriate description. Similarly, the features 508 are extracted in the same fashion as described above in conjunction with operation 422, with the exception that the curated query set 510 is used to identify the features.

The extracted features 508 can be used in some embodiments to update the ranking and selection model in accordance with the machine learning model used to create the ranking and selection model. As previously described, this can be done on a periodic or aperiodic basis or not at all, if the embodiment doesn't use the extracted features to update the model.

The description 506 and features 508 are stored in a data store 512. Data store 512 can be the same data store 322 as that illustrated in FIG. 3. The stored information is then used by the digital assistant system 514 during runtime as previously described.

Figure 6:
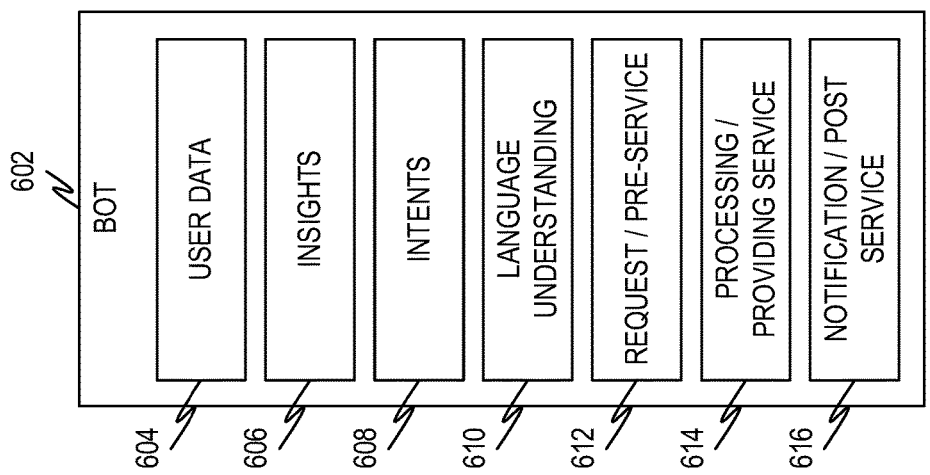
FIG. 6 illustrates an example of the various parts of an extension bot.

FIG. 6 illustrates an example of the various parts of an extension bot 602. The parts illustrated and discussed can be received and deployed as part of a unitary data structure or may be received and deployed in data structures that combine one or more of the illustrated parts. Furthermore, not all parts may be included in all bots. Bots can have one or more of the parts described below in any combination.

An extension bot 602 can comprise user data 604 that the bot needs in order to operate. For example, if a task the bot provides is booking a flight, the bot will need the user's name and other information required by the booking company to book the flight. Some of this information is user data that the digital assistant has access to and that the bot needs to be given access to (with the user's permission) in order to accomplish its task. Such user data can, for example, be obtained from the user and/or from a data store such as user profile and data store 218.

As previously discussed, an insight is a specific piece of information about a user that the digital assistant has access to or can deduce from the information that the digital assistant has access to. Insights are often related to context information, such as the user is in a meeting, driving a vehicle, at home, and so forth. Insights 606 represent the insights that the bot 602 wants access to in order to do the work. For example, if the user says "order me a pizza," the bot needs to know where to deliver the pizza, which is presumably the user's current location in the absence of any other direction from the user. Thus, the bot may need access to the user's current location insight in order to fill its task.

Intents 608 represent the intents that the bot would like to "subscribe" to. In other words, these are the intents produced by the built in LU model that should trigger the bot. In addition, the intents can have an associated confidence score to allow the bot to decide whether there is sufficient confidence in the intent to trigger and/or confidence score threshold that the digital assistant should trigger the bot on.

As previously discussed, in some embodiments a bot may have its own custom LU model in order to determine its own intents. The custom LU model can be described by positive and/or negative example queries and/or rules. Language understanding part 610 represents the custom LU model and/or, for those embodiments that use queries and/or rules to describe the LU model, the queries/rules used to describe it.

Request/pre-service part 612 represents executable instructions that should be called prior to calling the actual instructions that provides the task. The executable instructions can accomplish any pre-processing needed and/or desired such as asking the user for information needed to complete the task if it is otherwise unavailable.

Processing/providing service part 614 represents executable instructions that accomplish the task the bot performs in accordance with the insight that triggered the task.

Notification/post service part 616 represent executable instructions that should be called after the main part 614. These instructions can accomplish any post-processing tasks that are needed such as data clean up, task termination, etc.

The bot 602 can perform more than one task. For those instances, the parts above may have some parts that are common to all tasks, some parts that are unique to a task or a combination thereof. In other words, in some instances, each task may have completely separate parts. In other instances, some parts may be common between multiple tasks.

Figure 7:
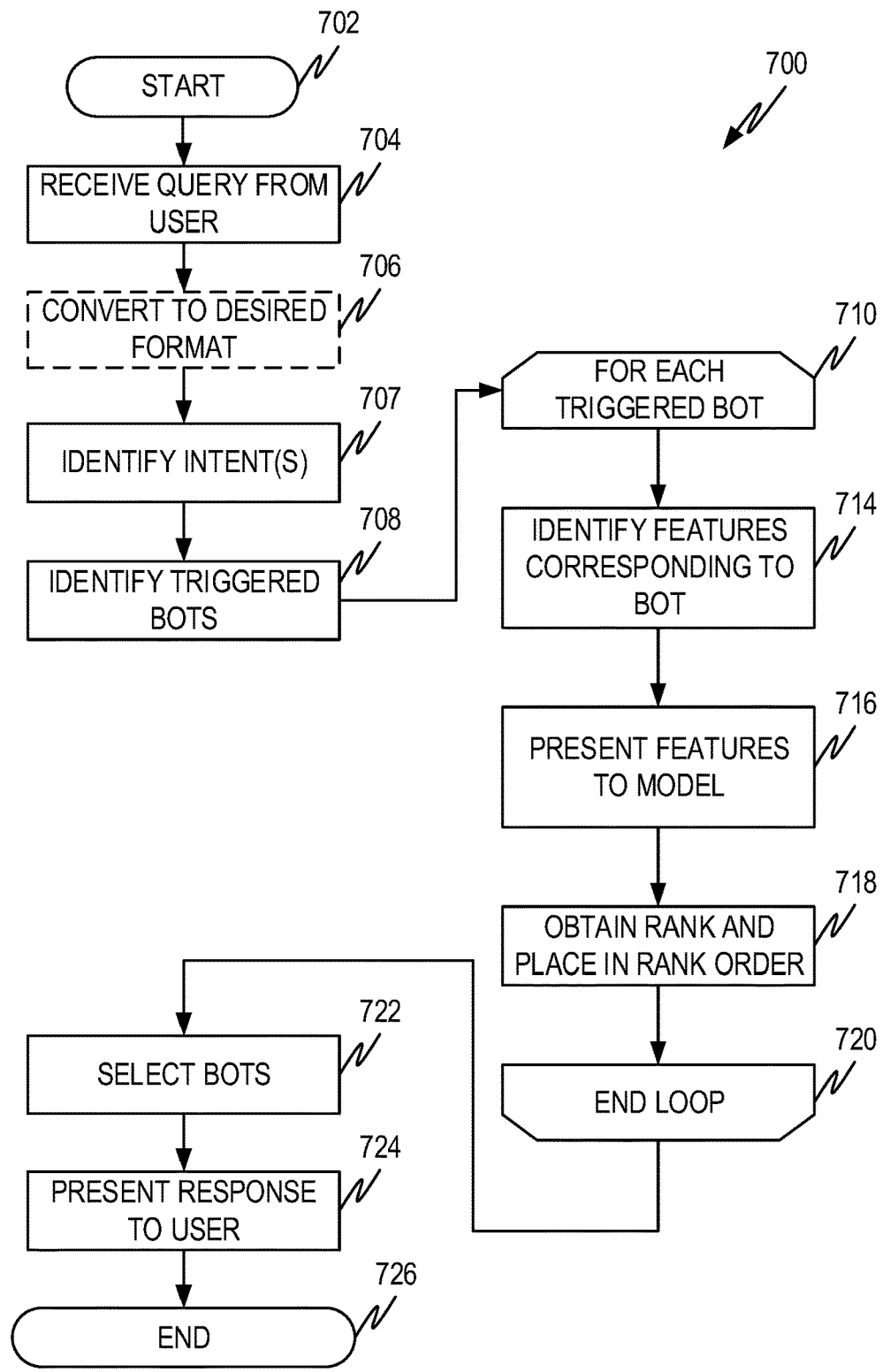
FIG. 7 illustrates an example flow diagram for automatically ranking and selecting bots to service a request.

FIG. 7 illustrates an example flow diagram 700 for automatically ranking and selecting bots to service a request. The flow diagram begins at operation 702 and proceeds to operation 704 where the query is received by the digital assistant system. As previously discussed, the query can come in any form such as audio (e.g., voice), text, ink, button press, and so forth.

Optional operation 706 represents any conversion done on the query to convert it to a desired format. The query is presented to the LU model in operation 707 and one or more intents are identified from the query as previously described. The identified intents can also have an associated confidence level that identifies the confidence that the intent is associated with the query.

Operation 708 identifies which bots trigger on the identified intent(s) and/or based on the query that was presented. This can be accomplished as previously described above.

Operations 710-720 represent a loop that is performed for each bot that has been triggered in operation 708. The loop begins at operation 710 and proceeds to operation 714 where the features associated with the triggered bot are identified. As previously discussed this can be accomplished in a variety of ways, such as by matching features in data store (e.g., data store 322, etc.) with a triggered bot, such as by using an identifier, by using information extracted from the bot during the triggering process and so forth.

Operation 716 presents the features retrieved from the data store to the ranking and selection model and obtains a rank for the bot. As previously described, the rank can be relative, absolute, or some combination thereof. The bot is placed in rank order (operation 718).

Operation 720 represents the end of the loop. After the loop is finished, the system has a ranked list of the activated bots.

Operation 722 selects the bots in accordance with selection criteria. As discussed, the selection criteria can comprise one or more of: selection based on a threshold (i.e. the top n ranked bots), selection based on user profile data, selection based on the type of bot (i.e., built in vs. extension), selection based on the category of the bot (i.e., performs tasks in a given domain), and/or so forth.

Operation 724 presents the selected bots to the user in one or more responses. The response can be appropriate for the channel best suited to communicate with the user. For example, if the user is operating a vehicle, the response could be presented in audio fashion rather than by text. This, operation 724 represents the functionality provided, for example, by operation 316 of FIG. 3 and includes any combination of formatting the response for a given response medium (audio, text, tactile, etc. and combinations thereof) and a response channel (mobile phone, desktop screen, band/watch or other wearable, etc. and combinations thereof).

The method ends at 726.

Example Machine Architecture and Machine-Readable Medium

Figure 8:
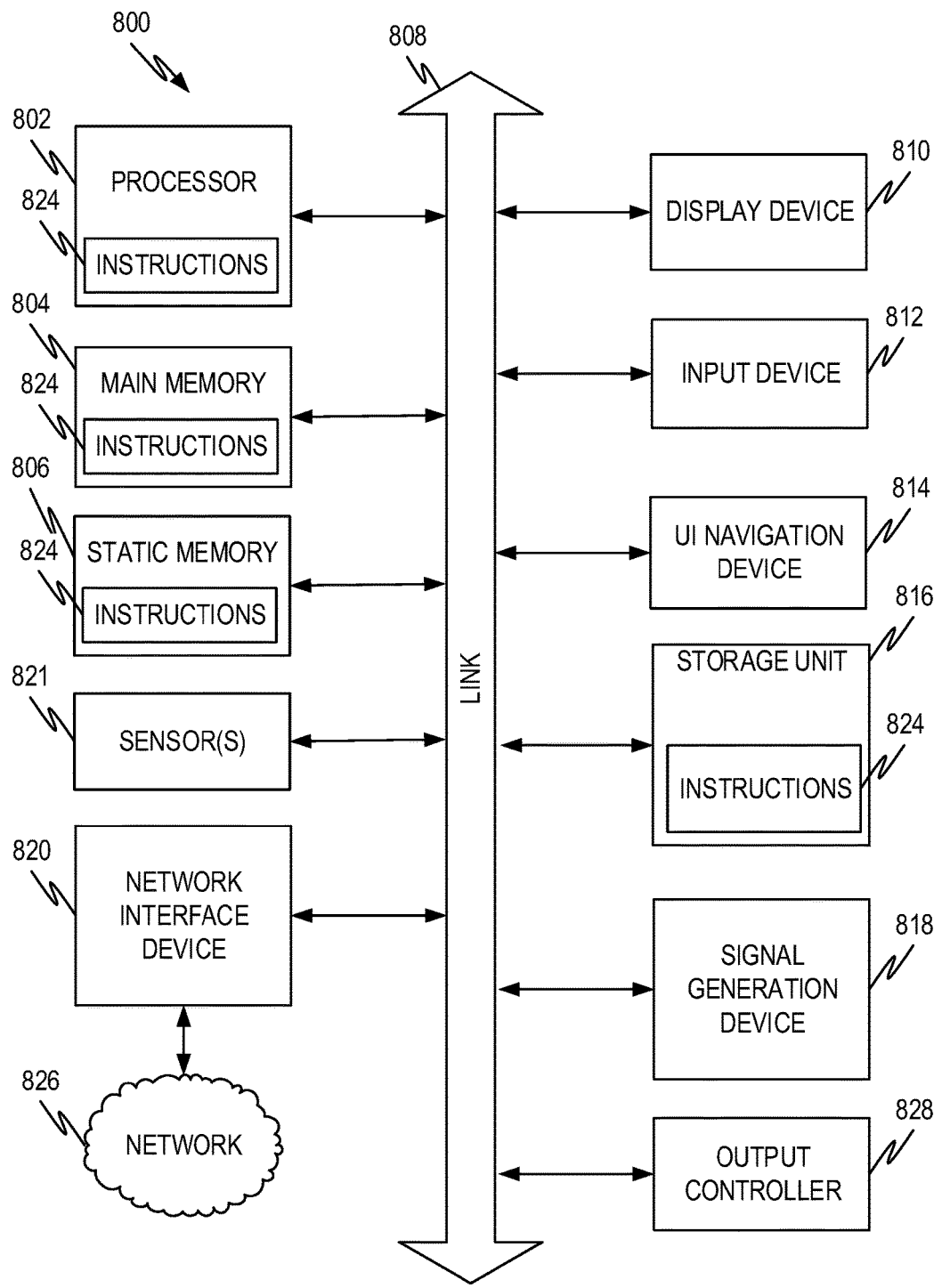
FIG. 8 illustrates a representative machine architecture suitable for implementing the systems and other aspects disclosed herein or for executing the methods disclosed herein.

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Readable Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1 A method for selecting and ranking service extensions, comprising:
receiving a query or an inference related to a user;
identifying any bots that activate in response to the query or inference;
ranking the activated bots by performing acts for each activated bot comprising:
identifying a set of features corresponding to the activated bot;
presenting at least a portion of the set of features to a ranking and response selection model trained via a machine learning process;
identifying a rank for the activated bot using the ranking and response selection model and the portion of the set of features; and
placing the activated bot in rank order compared to other activated bots to create a ranked list of bots;
selecting at least one bot from the ranked list of bots; and
presenting an output of at least one bot to the user.

Example 2 The method of example 1, further comprising converting the query from one format to another format for processing.

Example 3 The method of example 1, wherein the set of features comprises at least one of:
features extracted from results of a language understanding model;
features extracted from how well a conversation progress under the hypothesis that a specific response is accepted and presented to the user;
features extracted from statistics collected for models used by tasks activities of the activated bot;
features extracted from the activated bot configuration; and
features extracted from an input source.

Example 4 The method of example 1, wherein the set of features further comprises at least one of:
a correlation metric between a language understanding model of a bot and a built-in language understanding model;
a list of tasks that the bot handles; and
at least one metric describing at least one query that causes the bot to trigger.

Example 5 The method of example 1, 2, 3, or 4, further comprising:
retrieving a set of curated queries;
executing the set of curated queries against a submitted bot;
gathering a set of features characterizing the submitted bot response to the set of curated queries; and
storing the set of features.

Example 6 The method of example 5, further comprising:
extracting from the submitted bot a set of features comprising tasks handled by the bot.

Example 7 The method of example 5, further comprising:
identifying a set of positive trigger examples or a set of negative trigger examples or both based on the submitted bot response to the set of curated queries.

Example 8 The method of example 1, 2, 3 or 4, further comprising:
identifying a set of representative bots;
identifying a training set of curated queries; and
using a machine learning process, creating the ranking and response selection process from the set of represented bots and the training set of curated queries.

Example 9 A computing system comprising:
a processor and executable instructions accessible on a machine-readable medium that, when executed, cause the system to perform operations comprising:
receiving a query or an inference related to a user;
identifying any bots that activate in response to the query or inference;
ranking the activated bots by performing operations for each activated bot comprising:
identifying a set of features corresponding to the activated bot;
presenting at least a portion of the set of features to a ranking and response selection model trained via a machine learning process;
identifying a rank for the activated bot using the ranking and response selection model and the portion of the set of features; and
placing the activated bot in rank order compared to other activated bots to create a ranked list of bots;
selecting at least one bot from the ranked list of bots; and
presenting an output of the at least one bot to the user.

Example 10 The system of example 9, wherein the set of features comprises features corresponding to the activated bot in the context of other activated bots and features calculated from a set of curated queries.

Example 11 The system of example 9, wherein the set of features comprises at least one of:
a confidence score of a language understanding model;
an indicator of entities detected by the language understanding model;
a confidence score distribution;
a frequency of triggering on top of an existing intent; and
an indicator of the type of queries that cause triggering.

Example 12 The system of example 9, wherein the set of features further comprises at least one of:
a correlation metric between a language understanding model of a bot and a built-in language understanding model;
a list of tasks that the bot handles; and
at least one metric describing at least one query that causes the bot to trigger.

Example 13 The system of example 9, 10, 11 or 12, further comprising:
retrieving a set of curated queries;
executing the set of curated queries against a submitted bot;
gathering a set of features characterizing the submitted bot response to the set of curated queries; and
storing the set of features.

Example 14 The system of example 13, further comprising:
extracting from the submitted bot a set of features comprising tasks handled by the bot.

Example 15 The system of example 13, further comprising:
identifying a set of positive trigger examples or a set of negative trigger examples or both based on the submitted bot response to the set of curated queries.

Example 16 The system of example 9, 10, 11 or 12, further comprising:
identifying a set of representative bots;
identifying a training set of curated queries; and
using a machine learning process, creating the ranking and response selection process from the set of represented bots and the training set of curated queries.

Example 17 A machine-readable medium having executable instructions encoded thereon, which, when executed by at least one processor of a machine, cause the machine to perform operations comprising:
  train a ranking and response selection model by performing operations comprising:
    identifying a set of representative bots;
    identifying a training set of curated queries; and
    using a machine learning process, creating the ranking and response selection process from the set of represented bots and the training set of curated queries;
  receive a query from a user or an inference related to a user;
  identify any bots that activate in response to the query;
  rank the activated bots by performing operations for each activated bot comprising:
    identify a set of features corresponding to the activated bot in the context of other activated bots;
    identify a second set of features calculated from a second set of curated queries;
    combine the set of features and the second set of features into a set of extracted features;
    present a subset of the set of extracted features to the ranking and response selection model;
    identify a rank for the activated bot using the ranking and response selection model and the subset of extracted features; and
    place the activated bot in rank order compared to other activated bots to create a ranked list of bots;
  select at least one bot from the ranked list of bots; and
  present an output of the at least one bot to the user.

Example 18 The machine-readable medium of example 17, wherein the machine learning process comprises at least one of:
  a regression based method;
  an instance based method;
  a regularization method;
  a decision tree method;
  a Bayesian method;
  a clustering method;
  an association rule learning method;
  a neural network method;
  a deep learning method;
  a dimensionality reduction method; and
  an ensemble method.

Example 19 The machine-readable medium of example 17, wherein the second set of features is extracted by operations comprising:
  retrieve a set of curated queries;
  execute the set of curated queries against a submitted bot;
  gather the second set of features characterizing the submitted bot response to the set of curated queries; and
  store the set of features.

Example 20 The machine-readable medium of example 17, 18, 19 or 20 wherein the set of features or second set of features comprises at least one of:
  features extracted from results of a language understanding model;
  features extracted from how well a conversation progress under the hypothesis that a specific response is accepted and presented to the user;
  features extracted from statistics collected for models used by tasks activities of the activated bot;
  features extracted from the activated bot configuration; and
  features extracted from an input source.

Example 21 A method for selecting and ranking service extensions, comprising:
  receiving a query or an inference related to a user;
  identifying any bots that activate in response to the query or inference;
  ranking the activated bots by performing acts for each activated bot comprising:
    identifying a set of features corresponding to the activated bot;
    presenting at least a portion of the set of features to a ranking and response selection model trained via a machine learning process;
    identifying a rank for the activated bot using the ranking and response selection model and the portion of the set of features; and
    placing the activated bot in rank order compared to other activated bots to create a ranked list of bots;
  selecting at least one bot from the ranked list of bots; and
  presenting an output of at least one bot to the user.

Example 22 The method of example 21, further comprising converting the query from one format to another format for processing.

Example 23 The method of example 21, or 22, wherein the set of features comprises at least one of:
  features extracted from results of a language understanding model;
  features extracted from how well a conversation progress under the hypothesis that a specific response is accepted and presented to the user;
  features extracted from statistics collected for models used by tasks activities of the activated bot;
  features extracted from the activated bot configuration; and
  features extracted from an input source.

Example 24 The method of example 21, 22, or 23, wherein the set of features further comprises at least one of:
  a correlation metric between a language understanding model of a bot and a built-in language understanding model;
  a list of tasks that the bot handles; and
  at least one metric describing at least one query that causes the bot to trigger.

Example 25 The method of example 21, 22, 23, or 24, further comprising:
  retrieving a set of curated queries;
  executing the set of curated queries against a submitted bot;
  gathering a set of features characterizing the submitted bot response to the set of curated queries; and
  storing the set of features.

Example 26 The method of example 25, further comprising:
  extracting from the submitted bot a set of features comprising tasks handled by the bot.

Example 27 The method of example 25, further comprising:
  identifying a set of positive trigger examples or a set of negative trigger examples or both based on the submitted bot response to the set of curated queries.

Example 28 The method of example 21, 22, 23, 24, 25, 26 or 27, further comprising:
  identifying a set of representative bots;
  identifying a training set of curated queries; and
  using a machine learning process, creating the ranking and response selection process from the set of represented bots and the training set of curated queries.

Example 29 The method of example 21, 22, 23, 24, 25, 26, 27 or 28, wherein the set of features comprises features corresponding to the activated bot in the context of other activated bots and features calculated from a set of curated queries.

Example 30 The method of example 21, 22, 23, 24, 25, 26, 27, 28, or 29, wherein the set of features comprises at least one of:
a confidence score of a language understanding model;
an indicator of entities detected by the language understanding model;
a confidence score distribution;
a frequency of triggering on top of an existing intent; and
an indicator of the type of queries that cause triggering.

Example 31 The method of example 21, 22, 23, 24, 25, 26, 27, 28, 29, or 30, wherein the machine learning process comprises at least one of:
a regression based method;
an instance based method;
a regularization method;
a decision tree method;
a Bayesian method;
a clustering method;
an association rule learning method;
a neural network method;
a deep learning method;
a dimensionality reduction method; and
an ensemble method.

Example 32 The method of example 21, 22, 23, 24, 25, 26, 27, 28, 29, 30 or 31, wherein identifying the set of features corresponding to the activated bot comprises:
identify a first set of features corresponding to the activated bot in the context of other activated bots;
identify a second set of features calculated from a set of curated queries;
combine the set of features and the second set of features into the set of features corresponding to the activated bot;

Example 33 The method of example 32, wherein identifying a second set of features calculated from a set of curated queries comprises identifying a closest set of features from among a set of features.

Example 34 An apparatus comprising means to perform a method as in any preceding example.

Example 35 Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for selecting and ranking service extensions, comprising:
receiving a query from a user or an inference related to the user;
identifying any bots that activate in response to the query or the inference;
ranking the activated bots by performing acts for each activated bot comprising:
identifying a set of features corresponding to the activated bot, at least a portion of the set of features being pre-calculated based on the activated bot processing a set of curated queries;
presenting at least a portion of the set of features to a ranking and response selection model trained via a machine learning process using the set of curated queries;
identifying a rank for the activated bot using the ranking and response selection model and the portion of the set of features; and
placing the activated bot in rank order compared to other activated bots to create a ranked list of bots;
selecting at least one bot from the ranked list of bots; and
presenting an output of the at least one bot to the user.

2. The method of claim 1, further comprising converting the query from one format to another format for processing.

3. The method of claim 1, wherein the set of features comprises at least one of:
features extracted from results of a language understanding model;
features extracted from how well a conversation progress under a hypothesis that a specific response is accepted and presented to the user;
features extracted from statistics collected for models used by tasks activities of the activated bot;
features extracted from a configuration of the activated bot; and
features extracted from an input source.

4. The method of claim 1, wherein the set of features further comprises at least one of:
a correlation metric between a language understanding model of a bot and a built-in language understanding model;
a list of tasks that the bot handles; and
at least one metric describing at least one query that causes the bot to trigger.

5. The method of claim 1, further comprising:
retrieving a set of curated queries;
executing the set of curated queries against a submitted bot;
gathering a set of features characterizing a response by the submitted bot to the set of curated queries; and storing the set of features.

6. The method of claim 5, further comprising:
extracting from the submitted bot a set of features comprising tasks handled by the submitted bot.

7. The method of claim 5, further comprising:
identifying a set of positive trigger examples or a set of negative trigger examples or both based on the response by the submitted bot to the set curated queries.

8. The method of claim 1, further comprising:
identifying a set of representative bots;
identifying a training set of curated queries; and
using a machine learning process, creating the ranking and response selection model from the set of represented bots and the training set of curated queries.

9. A computing system comprising:
a processor and executable instructions accessible on a machine-readable medium that, when executed, cause the computing system to perform operations comprising:
receiving a query from a user or an inference related to the user;
identifying any bots that activate in response to the query or the inference;
ranking the activated bots by performing operations for each activated bot comprising:

identifying a set of features corresponding to the activated bot, at least a portion of the set of features being pre-calculated based on the activated bot processing a set of c mated queries;
presenting at least a portion of the set of features to a ranking and response selection model trained via a machine learning process using the set of curated queries;
identifying a rank for the activated bot using the ranking and response selection model and the portion of the set of features; and
placing the activated bot in rank order compared to other activated bots to create a ranked list of bots;
selecting at least one bot from the ranked list of bots; and
presenting an output of the at least one bot to the user.

10. The computing system of claim 9, wherein the set of features comprises features corresponding to the activated bot in the context of other activated bots and features calculated from a set of curated queries.

11. The computing system of claim 9, wherein the set of features comprises at least one of;
a confidence score of a language understanding model;
an indicator of entities detected by the language understanding model;
a confidence score distribution;
a frequency of triggering on top of an existing intent; and
an indicator of a type of queries that cause triggering.

12. The computing system of claim 9, wherein the set of features further comprises at least one of:
a correlation metric between a language understanding model of a bot and a built-in language understanding model;
a list of tasks that the bot handles; and
at least one metric describing at least one query that causes the bot to trigger.

13. The computing system of claim 9, further comprising:
retrieving a set of curated queries;
executing the set of curated queries against a submitted bot;
gathering a set of features characterizing a response by the submitted bot to the set of coated queries; and
storing the set of features.

14. The computing system of claim 13, further comprising:
extracting from the submitted bot a set of features comprising tasks handled by the submitted bot.

15. The computing system of claim 13, further comprising:
identifying a set of positive trigger examples or a set of negative trigger examples or both based on the submitted bot response to the set of curated queries.

16. The computing system of claim 9, further comprising:
identifying a set of representative bots;
identifying a training set of curated queries; and
using a machine learning process, creating the ranking and response selection model from the set of represented bots and the training set of curated queries.

17. A non-transitory machine-readable medium having executable instructions encoded thereon, which, when executed by at least one processor of a machine, cause the machine to perform operations comprising:
training a ranking and response selection model by performing operations comprising:
identifying a set of representative bots;
identifying a training set of curated queries; and
using a machine learning process, creating the ranking and response selection
model from the set of represented bots and the training set of curated queries;
receiving a query from a user or an inference related to the user;
identifying any bots that activate in response to the query or the inference:
ranking the activated bots by performing operations for each activated bot comprising:
identifying a set of features corresponding to the activated bot in the context of other activated bots;
identifying a second set of features calculated from a second set of curated queries;
combining the set of features and the second set of features into a set of extracted features;
presenting a subset of the set of extracted features to the ranking and response selection model;
identifying a rank for the activated bot using the ranking and response selection model and the subset of extracted features; and
placing the activated bot in rank order compared to other activated bots to create a ranked list of bots;
selecting at least one bot from the ranked list of bots; and
presenting an output of the at least one bot to the user.

18. The non-transitory machine-readable medium of claim 17, wherein the machine learning process comprises at least one of:
a regression based method;
an instance based method;
a regularization method;
a decision tree method;
a Bayesian method;
a clustering method;
an association rule learning method;
a neural network method;
a deep learning method;
a dimensionality reduction method; and
an ensemble method.

19. The non-transitory machine-readable medium of claim 17, wherein the second set of features is extracted by operations comprising:
retrieving a set of curated queries;
executing the set of curated queries against a submitted bot;
gathering the second set of features characterizing a response by the submitted bot to the set of curated queries; and
storing the set of features.

20. The non-transitory machine-readable medium of claim 17, wherein the set of features or second set of features comprises at least one of:
features extracted from results of a language understanding model;
features extracted from how well a conversation progress under a hypothesis that a specific response is accepted and presented to the user;
features extracted from statistics collected for models used by tasks activities of the activated bot;
features extracted from a configuration of the activated bot; and
features extracted from an input source.

* * * * *